N. McC. DAVIDSON.
HOT WATER DEFLECTOR.
APPLICATION FILED FEB. 9, 1911.

1,086,143.

Patented Feb. 3, 1914.

Witnesses
Edwin L. Bradford
G. Ferd. Vogt

Inventor
N. McC. Davidson
By Mann & Co.
Attorneys

UNITED STATES PATENT OFFICE.

NELSON McCLELLAN DAVIDSON, OF HANOVER, PENNSYLVANIA.

HOT-WATER DEFLECTOR.

1,086,143. Specification of Letters Patent. Patented Feb. 3, 1914.

Application filed February 9, 1911. Serial No. 607,490.

*To all whom it may concern:*

Be it known that I, NELSON MCCLELLAN DAVIDSON, a citizen of the United States, residing at Hanover, in the county of York and State of Pennsylvania, have invented certain new and useful Improvements in Hot-Water Deflectors, of which the following is a specification.

My invention relates to an improved pipe-fitting for connecting with the T-joints used in the pipes of hot-water heating systems.

The object of this invention is to provide for the trade an improved device having a screw-thread by which it may be connected with either one of the three screw-threaded openings of a standard T-fitting of the kind numerously used in the pipes of a hot-water system for heating, where one pipe branches from another and where it is desirable to have means that will equalize the circulation of hot water in both pipes.

Figure 1:
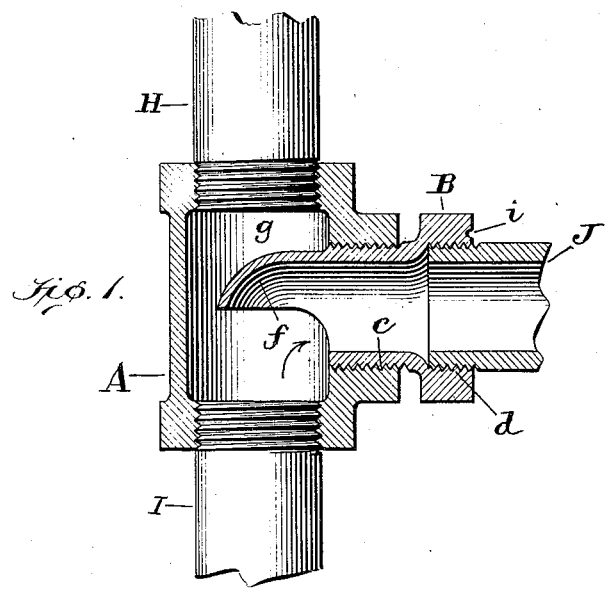
Figure 2:
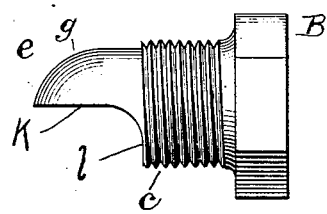
Figure 3:
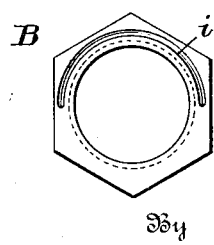

In the drawing, Figure 1 is a section of the new union device connected with a standard T-joint. Fig. 2 is a side view of the union deflector. Fig. 3 is an end view of the union deflector.

The invention is particularly useful where pipes branch off and lead to a radiator. Radiators are not shown in the drawing, because any plumber or person skilled in the art will readily understand the application of my improved means to hot water pipes that lead to radiators.

I use an ordinary malleable iron three-way fitting, or T-joint, A, such as plumbers usually carry in stock; this T-fitting has three openings each of which is internally screw-threaded; the pipes used are also of the ordinary kind having their end exteriorly screw-threaded.

It is well-known that the relative amount of hot-water that will pass into or flow through two pipes of the same size, where a three-way fitting is used to enable a connection to be made for one pipe to branch from the other, can not always be predetermined on account of variations in friction of the water due to different positions of the main and branch pipes, variation in the rapidity of movement of the water in the two pipes respectively, variation in the loss of heat from the two pipes where one pipe is more exposed to cold air than the other, and other causes that are purely local. It is a desideratum therefore to provide a water deflector that can be applied to the ordinary standard three-way fitting.

My present invention comprises a device, B, having a cylindric body provided with an exterior screw-thread, $c$, at one side of which is an enlarged head having a plural number of exterior sides adapted to be grasped by a wrench, and within said head is a circular passage having an internal screw-thread, $d$; at the opposite side of the said exterior screw-thread is an end whose extremity, $e$, is rounded and forms a concavo-convex shell, $f$, which projects forward at, $g$, as a continuation of one-half of said cylindric body—said concavo-convex shell having an open mouth provided with a longitudinal edge, $k$, and a crosswise edge, $l$,—the said longitudinal edge coinciding with a line extending centrally and longitudinally of said cylindric body and the crosswise edge being substantially in alinement with the said exterior screw-threads, $c$, whereby the open-mouth has a capacity for the flow of liquid greater than that of the passage in said cylindric body. Instead of the head having six sides it may have eight or only four. This device is a separate and complete pipe-fitting and as a ready-made article may be kept on hand by plumbers just as they now keep on hand T's, unions, single-joints and other ready-made fittings.

In the view shown in Fig. 1 all the connections of the T-joint, A, are for pipes of the same size, though this fact does not affect my inventive idea; in describing this particular arrangement of pipes, it may be assumed that the riser pipe, H, leads from a lower to an upper floor of a house structure; the pipe, I, is the hot-water supply pipe screwed into the bottom of the T-joint, and the branch pipe, J, is horizontal and has a right-angled position with respect to the riser pipe, H. In order that the branch pipe, J, in Fig. 1 shall receive the same amount of hot-water circulation as the riser pipe, H, the new form of union deflector, B, $e$, is employed. This device serves, first, to couple the branch pipe, J, with the T-fitting, A; and second as the finger-like projection, $e$, extends into the T-fitting and has position therein crosswise of the open end of the riser pipe, H, it serves to deflect a certain proportion of hot-water into the branch pipe, J.

The hexagon head is provided on its exterior end-face with a curved groove, $i$, whose position corresponds with that of the curved or concavo-convex shape of the finger-like projection, e. This exterior curved groove, i, serves as an indicator or guide to enable a person to properly adjust the axial position of the deflector, e.

Having thus described my invention what I claim and desire to secure by Letters Patent is,—

1. The herein-described attachment for T joints of water pipes consisting of a cylindric body provided with an exterior screw-thread at one side of which is an enlarged head to be grasped by a wrench and said cylindric body and head provided with an internal passage, and the cylindric body at the opposite side of the exterior screw-thread having an end whose extremity is rounded forming a convex-concavo shell which projects as a continuation of one-half of said cylindric body—said convex-concavo shell provided with an open mouth having a longitudinal edge coinciding with a line extending centrally and longitudinally of said cylindric body and also having a crosswise edge substantially in alinement with said exterior screw-threads, whereby the open mouth has a capacity for the flow of liquid greater than that of the internal passage in said cylindric body.

2. The herein described attachment for T joints of water pipes, which consists of a hollow cylindrical body portion provided with an exterior screw thread at one end and having an enlarged portion provided with flattened sides arranged to be grasped by a wrench, said body portion having an integral end member whose extremity is rounded forming a shell which projects as a continuation of one half of said cylindrical body portion, said shell having longitudinal edges coinciding with a plane extending through the axis of said cylindrical body, the mouth thus formed between the sides and end of the shell being of greater area than the cross sectional area of said cylindrical body portion, whereby the mouth has a greater capacity than that of the body portion.

In testimony whereof I affix my signature in presence of two witnesses.

NELSON McCLELLAN DAVIDSON.

Witnesses:
HARRY L. MILLER,
PAUL E. LAU.